(12) United States Patent
Tanaka et al.

(10) Patent No.: US 12,205,182 B2
(45) Date of Patent: Jan. 21, 2025

(54) FOOD AND DRINK PROVISION SYSTEM

(71) Applicant: Kura Sushi, Inc., Sakai (JP)

(72) Inventors: Kunihiko Tanaka, Sakai (JP); Daisuke Hashimoto, Sakai (JP)

(73) Assignee: KURA SUSHI, INC., Sakai (JP)

( * ) Notice: Subject to any disclaimer, the term of this patent is extended or adjusted under 35 U.S.C. 154(b) by 0 days.

(21) Appl. No.: 18/010,494

(22) PCT Filed: Jul. 1, 2021

(86) PCT No.: PCT/JP2021/025037
§ 371 (c)(1),
(2) Date: Dec. 15, 2022

(87) PCT Pub. No.: WO2022/004863
PCT Pub. Date: Jan. 6, 2022

(65) Prior Publication Data
US 2023/0237597 A1  Jul. 27, 2023

(30) Foreign Application Priority Data
Jul. 1, 2020 (JP) .................................. 2020-114513

(51) Int. Cl.
*G06Q 50/12* (2012.01)
*G06Q 10/02* (2012.01)
*G06Q 30/04* (2012.01)

(52) U.S. Cl.
CPC ............. *G06Q 50/12* (2013.01); *G06Q 10/02* (2013.01); *G06Q 30/04* (2013.01)

(58) Field of Classification Search
CPC ......... G06Q 50/12; G06Q 10/02; G06Q 30/04
See application file for complete search history.

(56) References Cited

U.S. PATENT DOCUMENTS 1,442,211 A * 1/1923 Baitinger ................ A47F 10/06
186/46
7,899,709 B2 * 3/2011 Allard ..................... A47F 10/06
219/388

(Continued)

FOREIGN PATENT DOCUMENTS

JP        H06-237846 A  *  8/1994  ............. A47F 10/06
JP        10-63927 A        3/1998

(Continued)

OTHER PUBLICATIONS

Doty, Laura, "Sushi Production Boning Up on Sushi Bars," Foodservice equipment & supplies, Aug. 2003, pp. 58-60.*

(Continued)

*Primary Examiner* — Nathan Erb
(74) *Attorney, Agent, or Firm* — Birch, Stewart, Kolasch & Birch, LLP

(57) ABSTRACT

A system includes: an entrance accepting unit configured to accept a seat-waiting request from a customer and store the request as acceptance information; a vacant seat processing unit configured to set any seat among a plurality of seats that has become vacant, as a vacant seat in association with seat information relating to the seat; a seat setting unit configured to associate the seat-waiting information with seat information relating to a vacant seat in a predetermined order under a predetermined condition when any seat among the seats for customers has been set as the vacant seat by the vacant seat processing unit; and a start setting unit configured to record eating and/or drinking start information that indicates start of eating and/or drinking in association with the seat information upon the acceptance information being associated with the seat information by the seat setting unit.

13 Claims, 16 Drawing Sheets

(56) References Cited

U.S. PATENT DOCUMENTS

| | | | |
|---|---|---|---|
| 10,395,186 B1* | 8/2019 | McCullough | H04L 67/306 |
| 2002/0052790 A1* | 5/2002 | Tomishima | G06Q 10/02 |
| | | | 705/5 |
| 2005/0122932 A1* | 6/2005 | Walter | G07C 11/00 |
| | | | 370/328 |
| 2015/0080021 A1* | 3/2015 | Bietz | H04W 64/00 |
| | | | 455/575.8 |
| 2017/0046800 A1* | 2/2017 | Zomet | G06Q 50/12 |
| 2018/0089597 A1 | 3/2018 | Takahashi et al. | |
| 2019/0102830 A1* | 4/2019 | Yin | G06Q 20/3276 |
| 2023/0009368 A1* | 1/2023 | Tanaka | A47F 10/06 |

FOREIGN PATENT DOCUMENTS

| | | |
|---|---|---|
| JP | 2004-240630 A | 8/2004 |
| JP | 2018-55336 A | 4/2018 |
| JP | 2019-3360 A | 1/2019 |
| JP | 2019-46244 A | 3/2019 |
| JP | 2019-103603 A | 6/2019 |

OTHER PUBLICATIONS

International Search Report (PCT/ISA/210), issued in PCT/JP2021/025037, dated Aug. 17, 2021.
Written Opinion of the International Searching Authority (PCT/ISA/237), issued in PCT/JP2021/025037 dated Aug. 17, 2021.

* cited by examiner

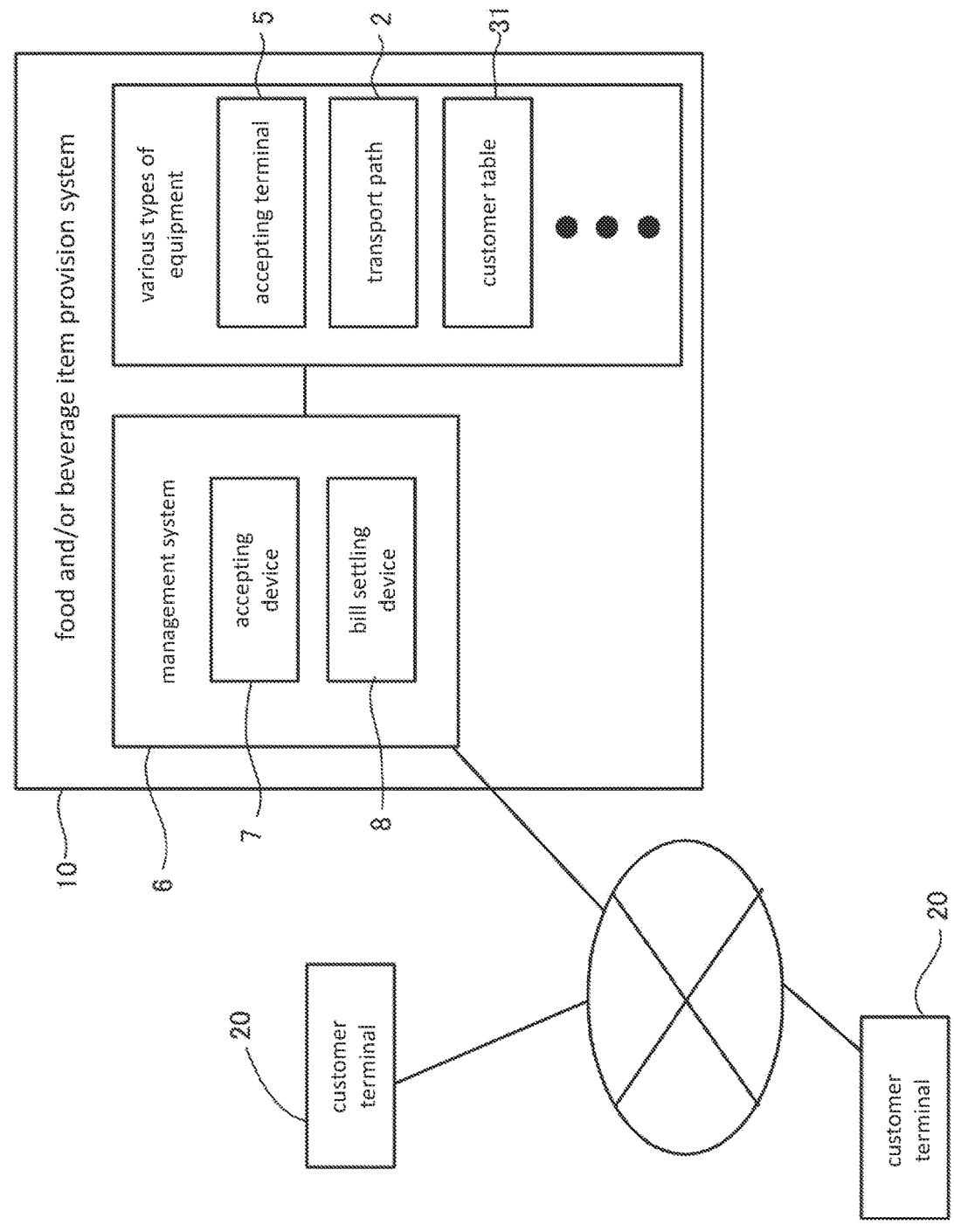
[FIG. 1]

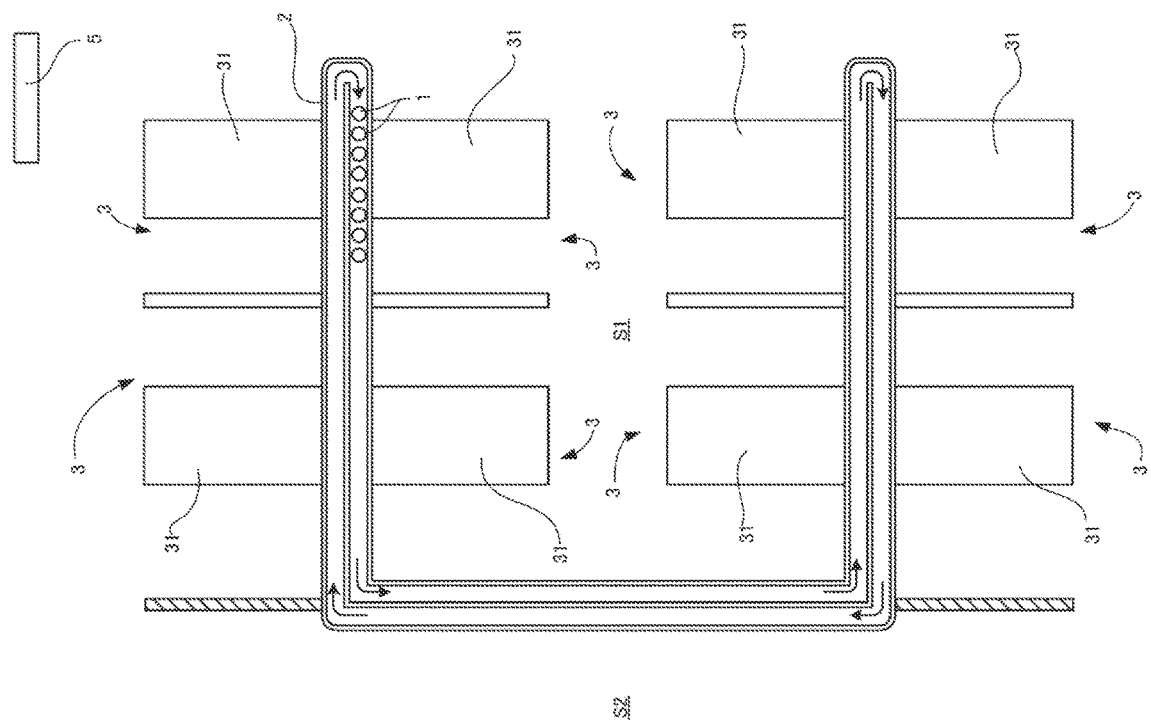
[FIG. 2]

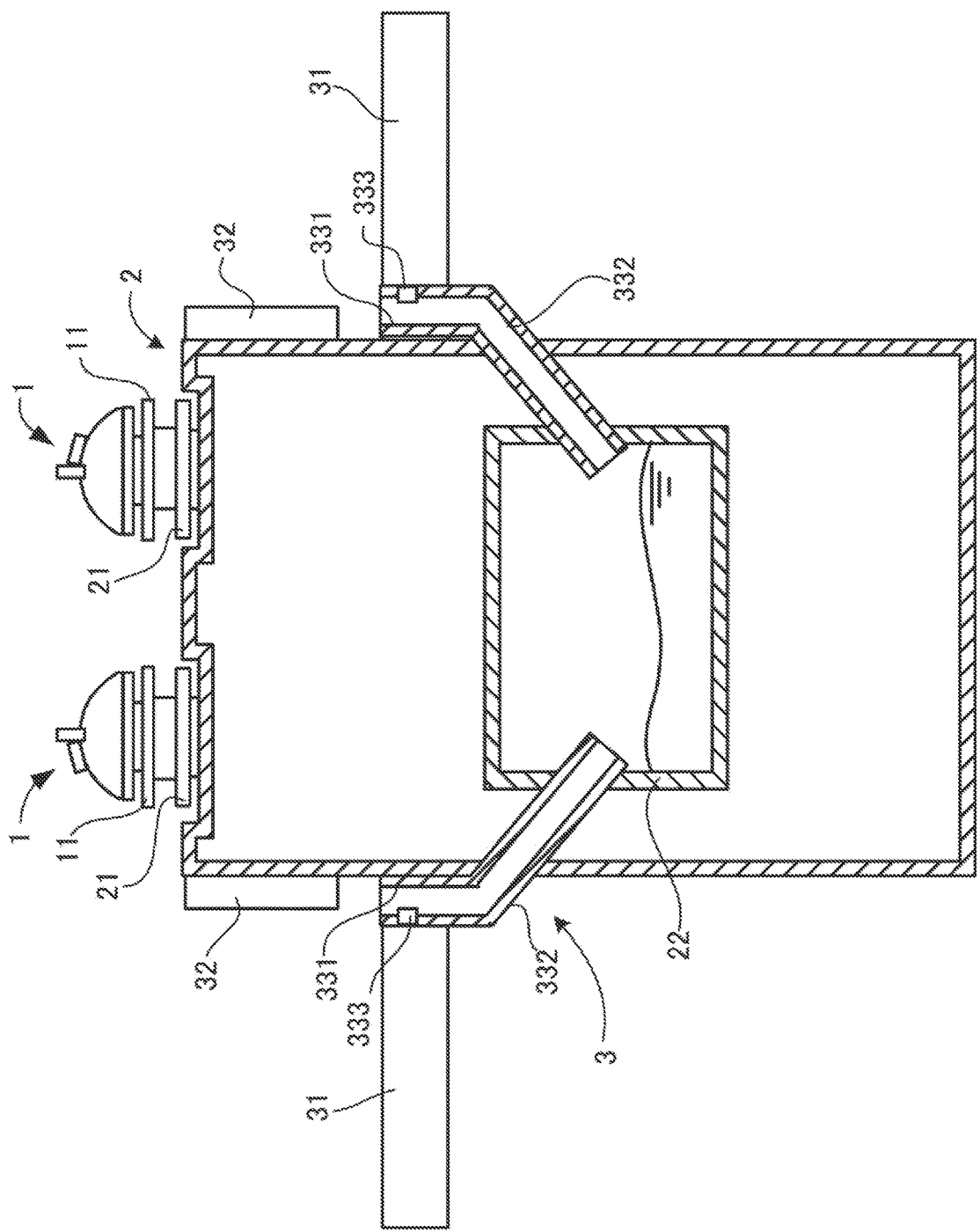

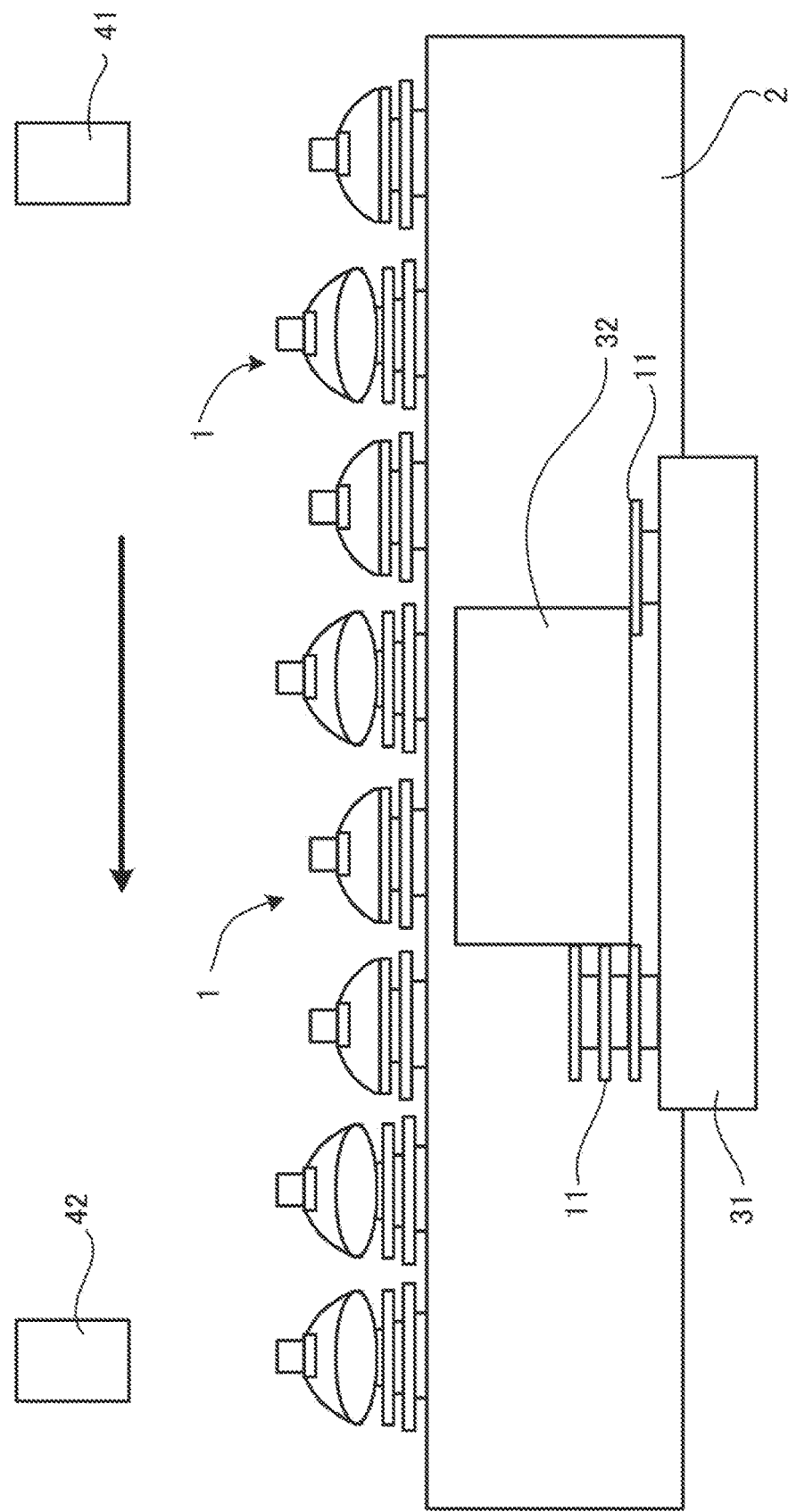
[FIG. 4]

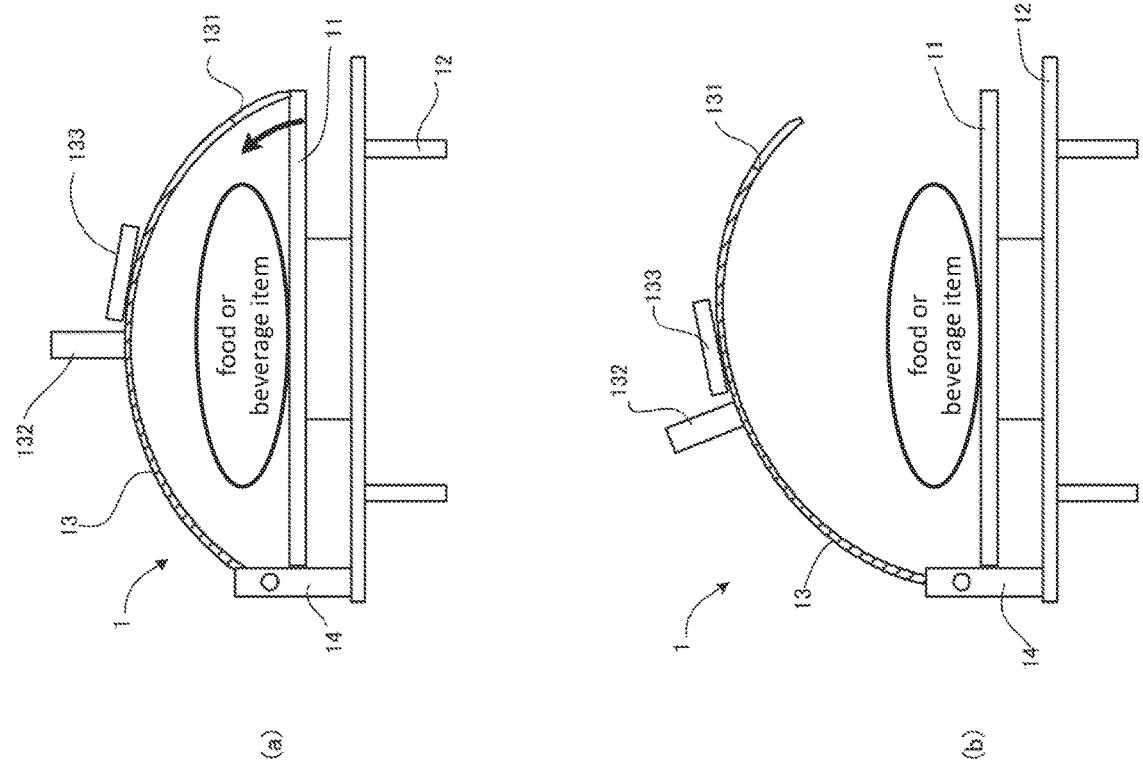
[FIG. 5]

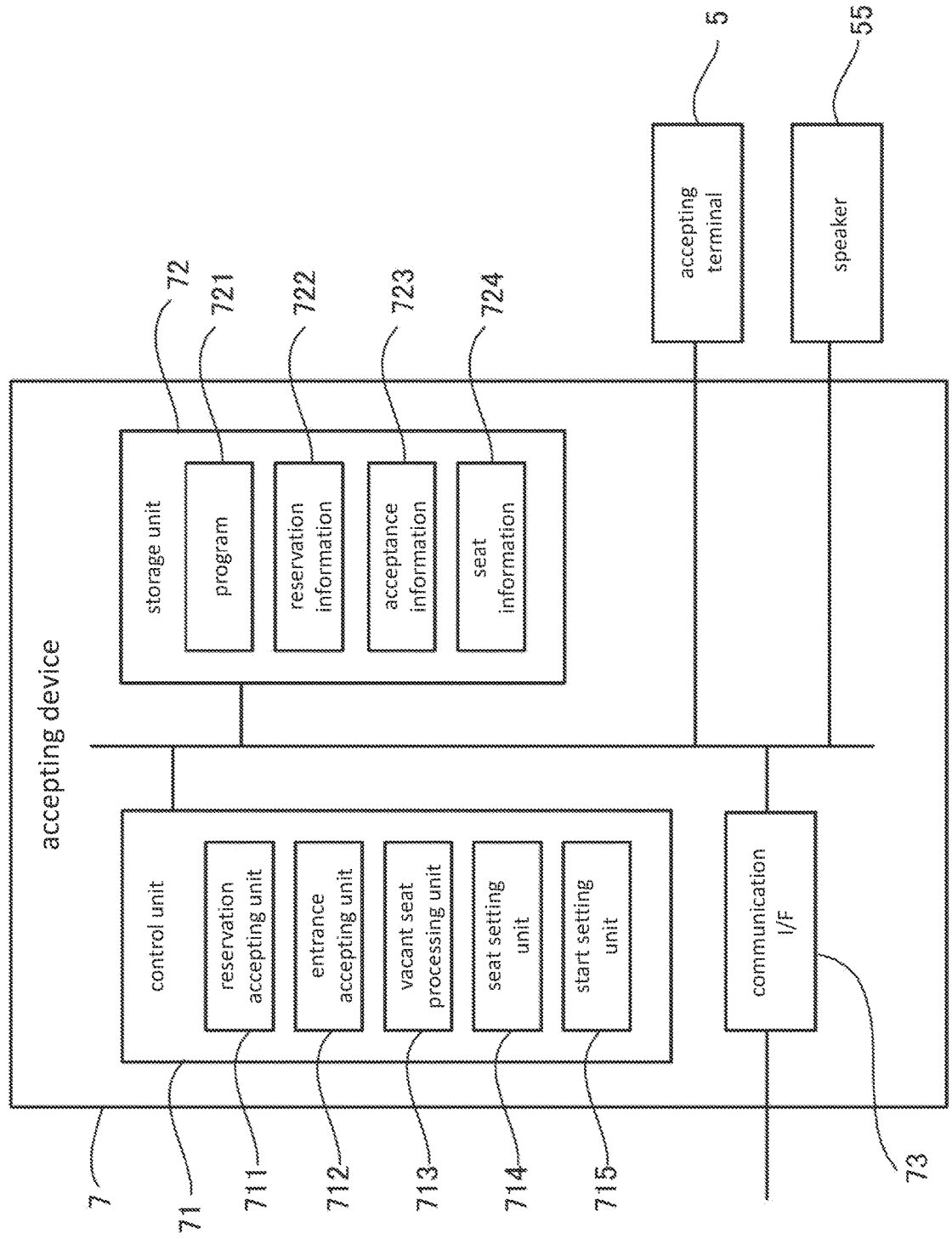
[FIG. 6]

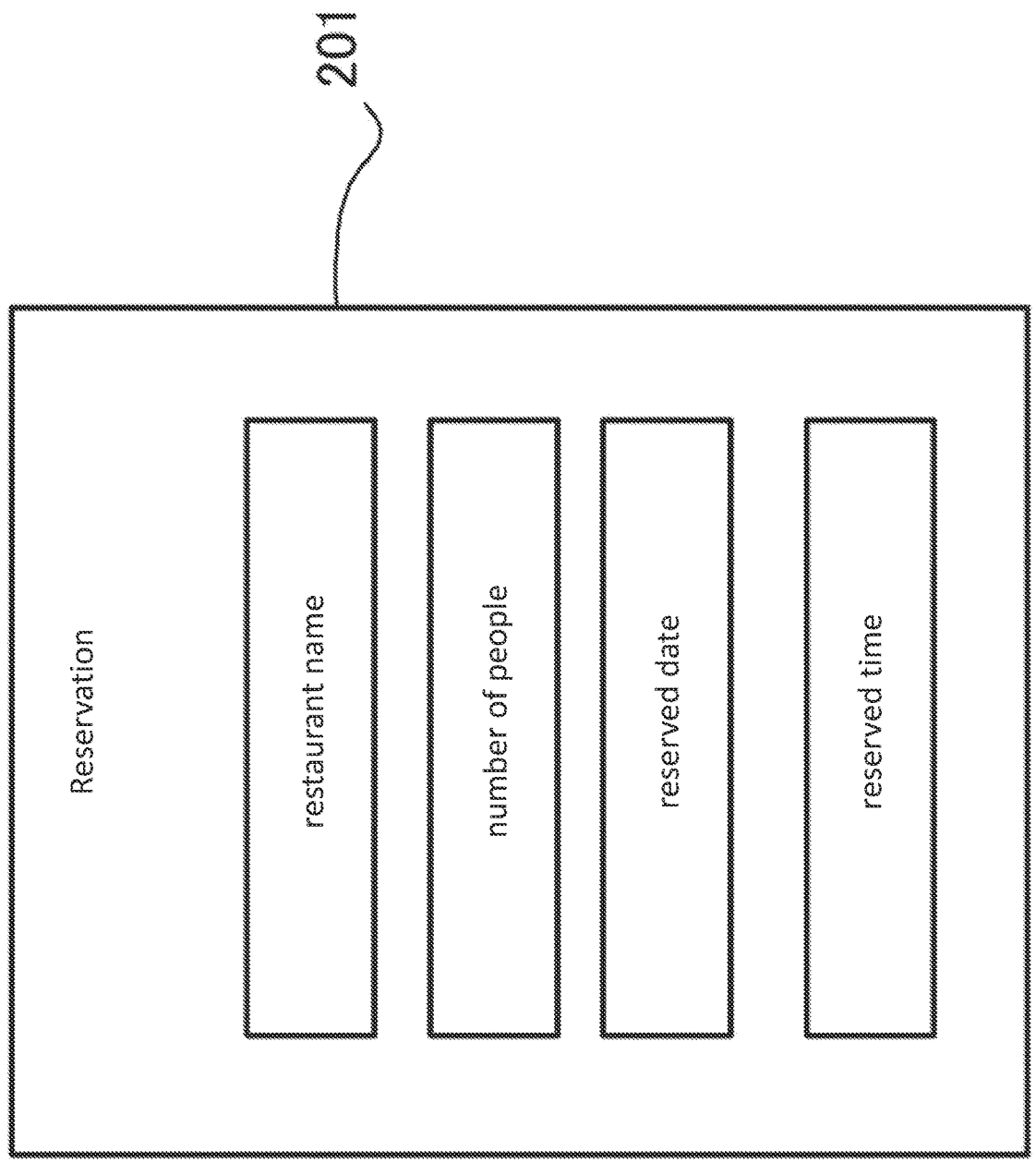

[FIG. 8]

reservation content restaurant name: ***** number of people: 2 reservation number: 250 scheduled guidance time:
18:00 to 18:10 on October 10th

Please select the number of people

| 1 | 2 | 3 |
| 4 | 5 | 6 or more |

Please enter reservation number, if you have.

51

[FIG. 10]
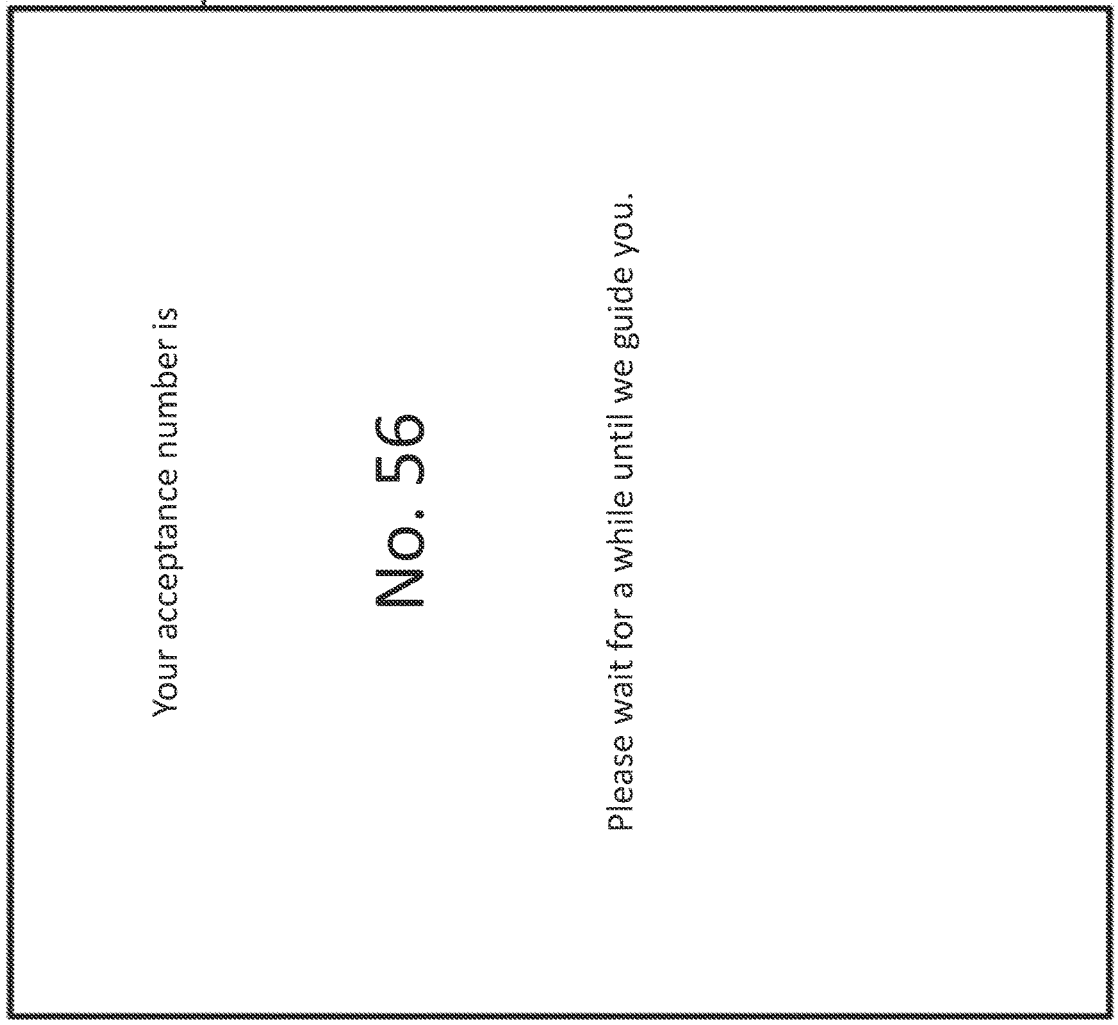

[FIG. 11]
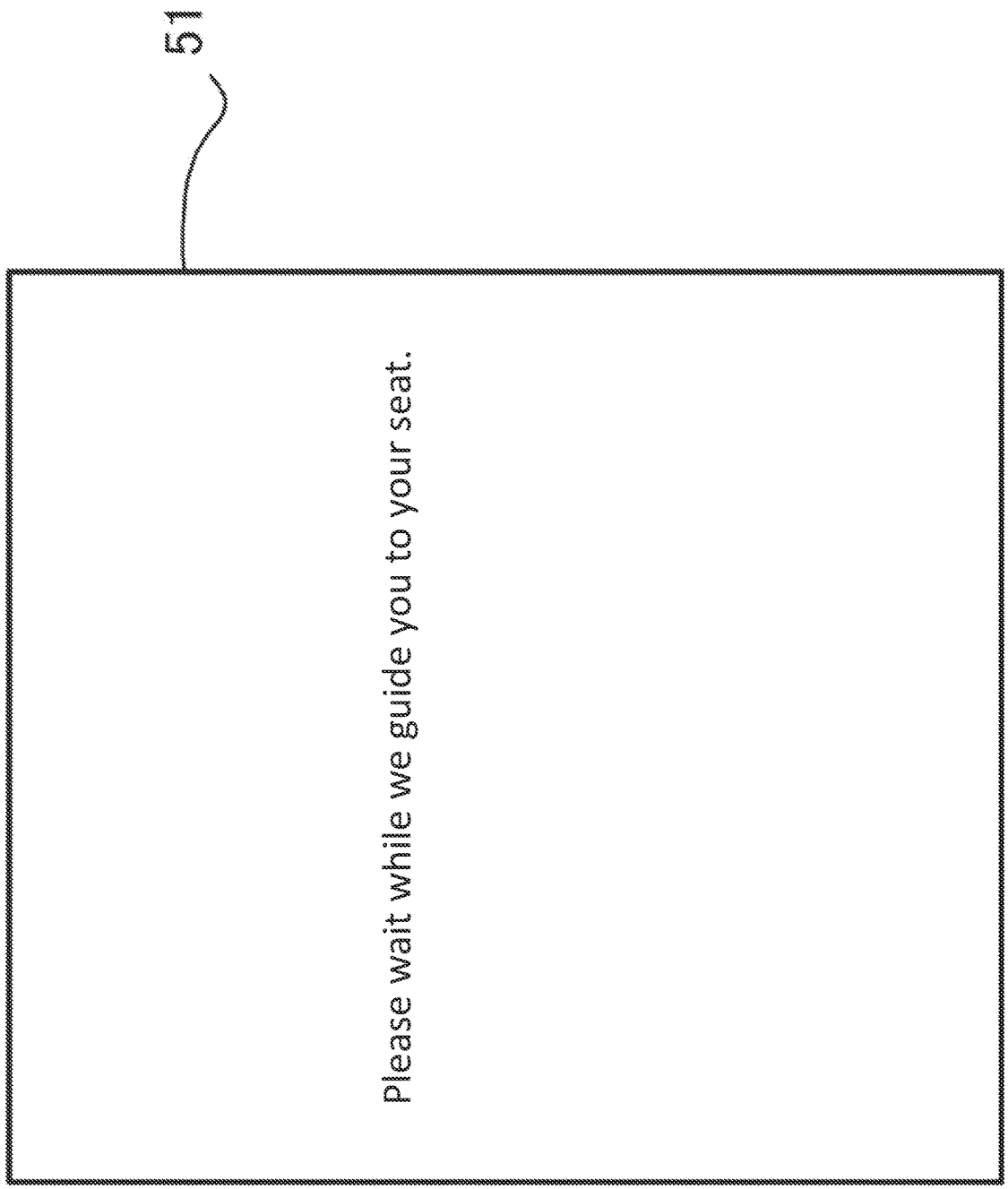

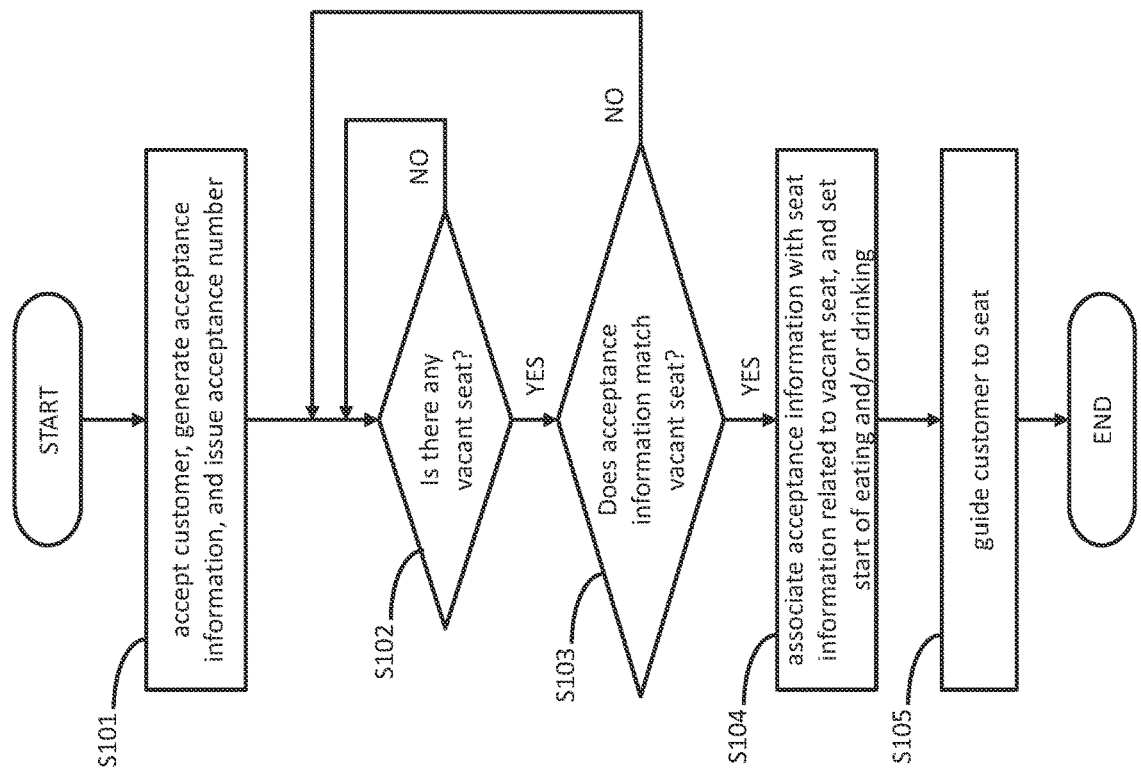
[FIG. 12]

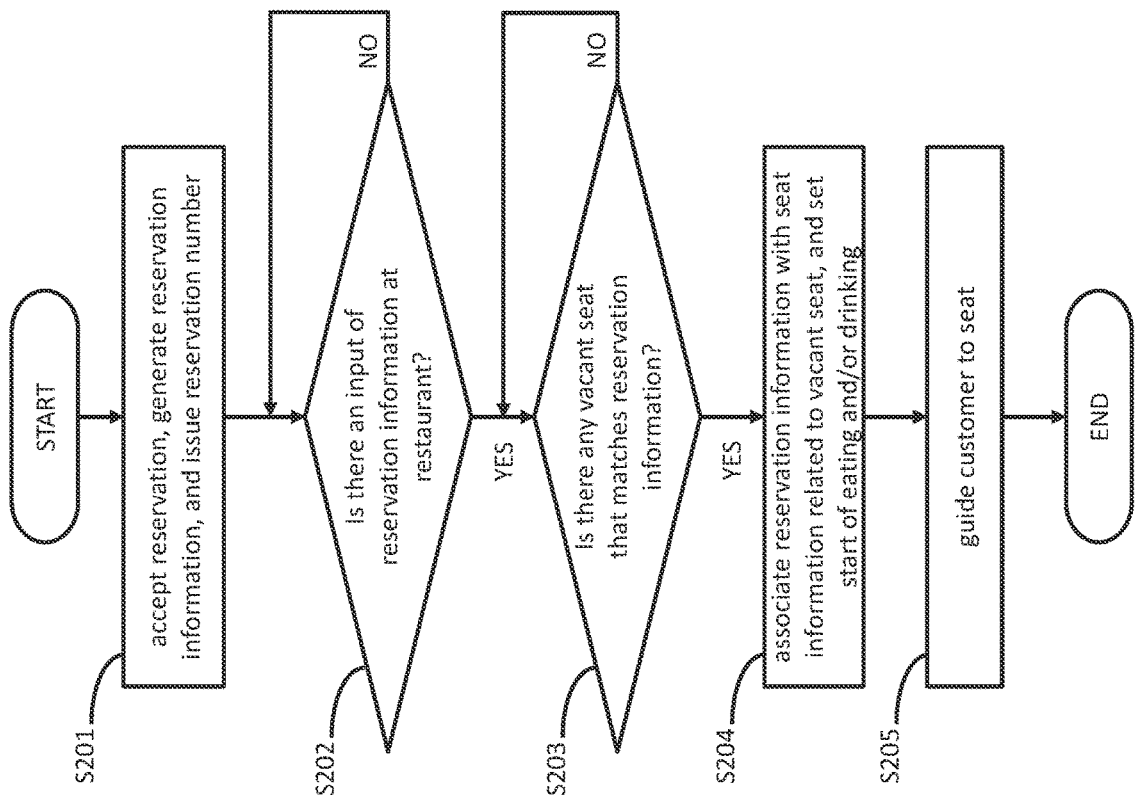
[FIG. 13]

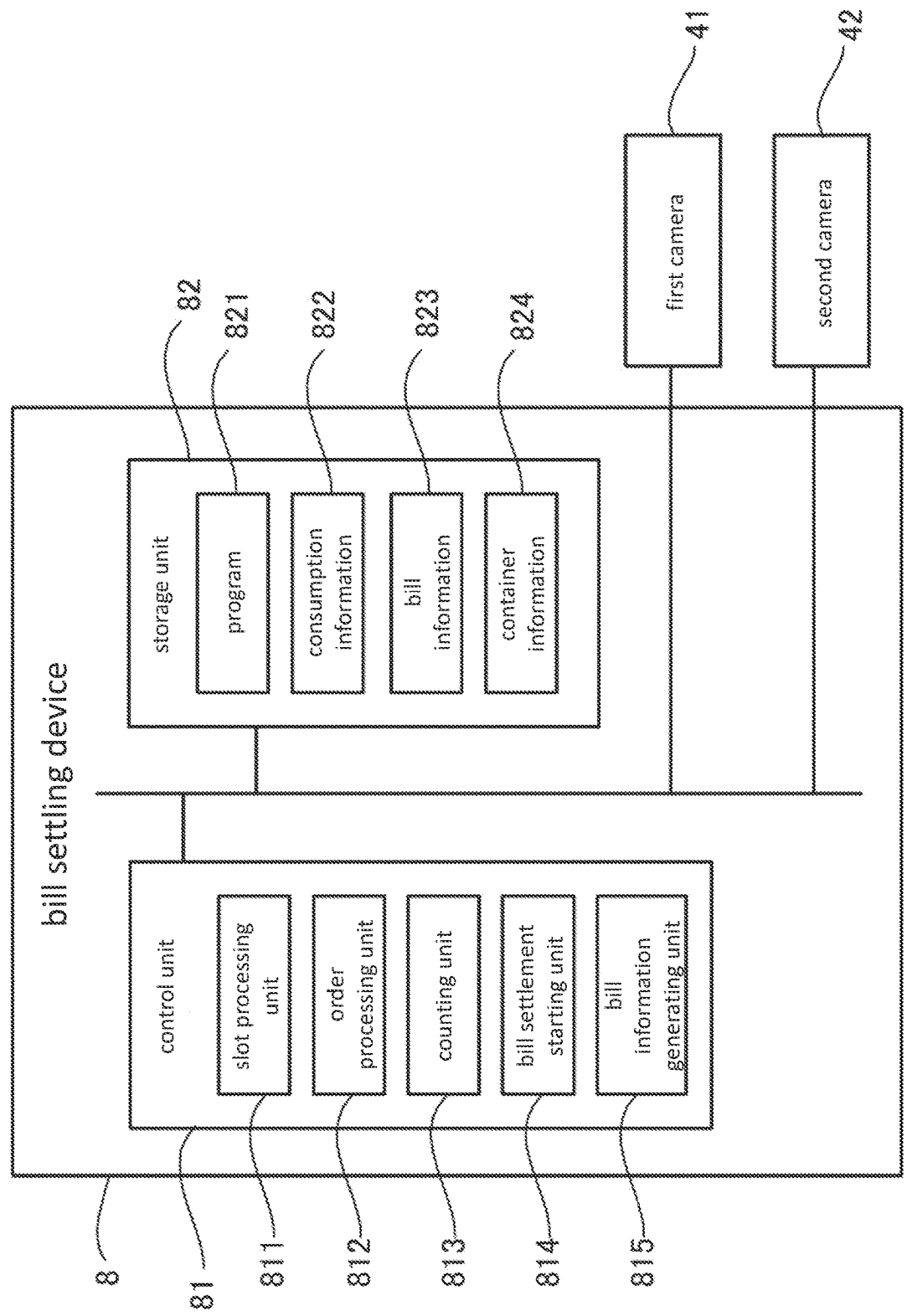
[FIG. 14]

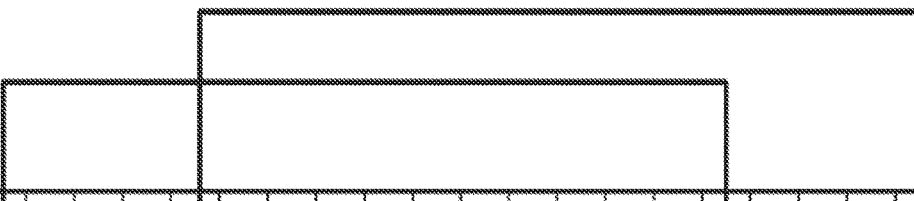
[FIG. 15]

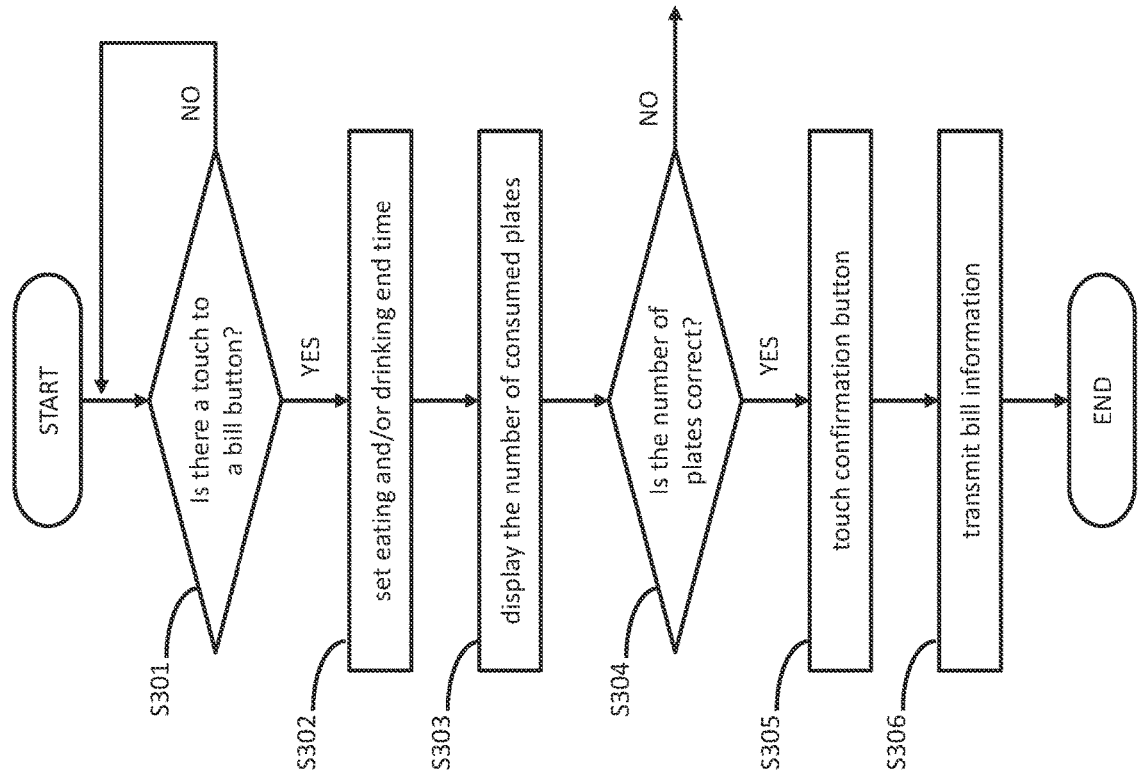
[FIG. 16]

FOOD AND DRINK PROVISION SYSTEM

TECHNICAL FIELD

The present invention relates to a food and/or beverage item provision system for providing food and/or beverage items to customers in a restaurant including a plurality of seats for customers.

BACKGROUND ART

A food and/or beverage item provision system such as the one used in a conveyor belt sushi restaurant is configured to take orders via touch panel displays installed on tables, for example (e.g., Patent Literature 1). Then, billing is performed based on the ordered food and/or beverage items.

CITATION LIST

Patent Literature

Patent Literature 1: JP 2019-103603A

SUMMARY OF INVENTION

Technical Problem

Conventionally, the time at which a customer is guided to a table is taken as the start of eating or drinking by the customer, and is recorded as an eating and/or drinking start time. Once such an eating and/or drinking start time is recorded, the customer is billed based on food and/or beverage items ordered before the start of bill settlement. However, if the start of eating or drinking at that table is not properly set, the number of ordered food and/or beverage items cannot be accurately calculated. For example, if a restaurant staff member forgets to set the start of eating or drinking and the eating and/or drinking start time is set after some time has elapsed from the start, some plates may not be counted even though food and/or beverage items on the plates have been consumed. Since the eating and/or drinking start time may be used not only as the basis of billing as described above but also for customer analysis, there is demand for measures to automatically acquire the eating and/or drinking start time. Also, there are similar problems and demand in providing food and/or beverage items other than those provided at conveyor belt sushi restaurants.

The present invention was made in order to solve the above-described problem, and has an object of providing a food and/or beverage item counting device capable of automatically acquiring a time point at which a customer guided to a seat starts eating or drinking.

Solution to Problem

A first food and/or beverage item provision system according to the present invention is a food and/or beverage item provision system for providing food and/or beverage items to a customer in a restaurant including a plurality of seats for customers, the system including: an entrance accepting unit configured to accept a seat-waiting request from a customer and store the request as acceptance information; a vacant seat processing unit configured to set any seat among the plurality of seats that has become vacant, as a vacant seat in association with seat information relating to the seat; a seat setting unit configured to associate the seat-waiting information with seat information relating to a vacant seat in a predetermined order under a predetermined condition when any seat among the seats for customers has been set as the vacant seat by the vacant seat processing unit; and a start setting unit configured to record eating and/or drinking start information that indicates start of eating and/or drinking in association with the seat information upon the acceptance information being associated with the seat information by the seat setting unit.

A second food and/or beverage item provision system according to the present invention is a food and/or beverage item provision system for providing food and/or beverage items to a customer in a restaurant including a plurality of seats for customers, the system including: a reservation accepting unit configured to store reservation information relating to a reservation from the customer and give reservation identification information associated with the reservation information to the customer; a vacant seat processing unit configured to set any seat among the plurality of seats that has become vacant, as a vacant seat in association with seat information relating to the seat; an entrance accepting unit configured to store entrance of the customer relating to the reservation information upon the reservation identification information being input at the restaurant; a seat setting unit configured to associate the reservation information of the entered customer with seat information relating to a vacant seat in a predetermined order under a predetermined condition when any seat among the seats for customers has been set as the vacant seat by the vacant seat processing unit; and a start setting unit configured to record eating and/or drinking start information that indicates start of eating and/or drinking in association with the seat information upon the reservation information being associated with the seat information by the seat setting unit.

The food and/or beverage item provision systems described above may further include: a bill settlement starting unit provided for each seat and configured to start bill settlement for the seat; and a bill information generating unit configured to calculate an amount of food and/or beverage items consumed at the seat during a period from the start of eating and/or drinking to the start of bill settlement and generate bill information based on the amount of food and/or beverage items.

The food and/or beverage item provision systems described above may further include an order processing unit provided for each seat and configured to accept an order of a food or beverage item, and the bill information generating unit may be configured to generate the bill information based on an order accepted by the order processing unit.

The food and/or beverage item provision systems described above may further include: a transport path that passes along the plurality of seats and is configured to transport a plate on which a food or beverage item is placed; a slot portion that is provided at each seat and into which the plate that has been taken out from the transport path and from which the food or beverage item has been consumed is slotted; and a slot processing unit configured to count the number of plates slotted into the slot portion, and the bill information generating unit may be configured to generate the bill information based on the number of plates counted by the slot processing unit.

The food and/or beverage item provision systems described above may further include: a transport path that passes along a seat for a customer and is configured to transport carriers on which plates are placeable with food and/or beverage items placed thereon; a first information acquisition unit disposed upstream of the seat and configured to acquire information relating to the carriers on the transport path; a second information acquisition unit disposed downstream of the seat and configured to acquire information relating to the carriers on the transport path; and a counting unit configured to count the number of plates taken out from the transport path to the seat. Each of the carriers may be provided with identification information for identifying the carrier. Each of the carriers may be capable of being in a first state in which a plate is placed on the carrier and a second state in which no plate is placed on the carrier. The counting unit may be configured to execute: a first determination step of determining which state the carrier is in with use of the first information acquisition unit; a second determination step of determining which state the carrier is in with use of the second information acquisition unit; a first storage step of storing identification information of the carrier and the state of the carrier acquired by the first information acquisition unit in association with each other; a second storage step of storing identification information of the carrier and the state of the carrier acquired by the second information acquisition unit in association with each other; and a counting step of counting a food or beverage item carried by the carrier as a food or beverage item consumed at the table if the carrier is determined to be in the first state with use of the first information acquisition unit and the same carrier is determined to be in the second state with use of the second information acquisition unit. The bill information generating unit may be configured to generate the bill information based on the number of plates counted by the counting unit.

In the food and/or beverage item provision systems described above, the seat setting unit may be configured to notify the customer of the seat information relating to the vacant seat after associating the seat information relating to the vacant seat.

Advantageous Effects of Invention

The food and/or beverage item provision systems according to the present invention make it possible to accurately acquire the time at which a customer started eating or drinking.

BRIEF DESCRIPTION OF DRAWINGS

FIG. 1 is a schematic configuration diagram of a food and/or beverage item provision system according to an embodiment of the present invention.

FIG. 2 is a partial plan view of a restaurant.

FIG. 3 is a cross-sectional view of a transport path.

FIG. 4 is a side view of the transport path.

FIG. 5 shows cross-sectional views of a container.

FIG. 6 is a block diagram of an accepting device.

FIG. 7 is an example of a reservation screen of a customer terminal.

FIG. 8 is an example of a reservation screen of the customer terminal.

FIG. 9 is an example of a screen of an accepting terminal.

FIG. 10 is an example of a screen of the accepting terminal.

FIG. 11 is an example of a screen of the accepting terminal.

FIG. 12 is a flowchart of accepting processing in a case where a reservation has not been made.

FIG. 13 is a flowchart of accepting processing in a case where a reservation has been made.

FIG. 14 is a block diagram of a bill settling device.

FIG. 15 is an example of a chronological list of container information.

FIG. 16 is a flowchart of bill settling processing.

DESCRIPTION OF EMBODIMENTS

1. Outline of Food and/or Beverage Item Provision System

The following describes an embodiment of a food and/or beverage item provision system according to the present invention with reference to the drawings. FIG. 1 is a schematic configuration diagram of the food and/or beverage item provision system.

As shown in FIG. 1, a food and/or beverage item provision system 10 according to the present embodiment is provided in a sushi restaurant, for example, and includes various types of equipment such as an accepting terminal 5 that accepts customers, a transport path 2 for transporting food and/or beverage items, and customer tables 31 including displays and the like, and a management system 6 for managing the equipment, accepting reservations, allocating seats to customers, billing, and the like. The management system 6 includes an accepting device 7 that mainly accepts customers and a bill settling device 8 that mainly performs bill settling processing. The management system 6 can be accessed by customer terminals 20 via a network such as the Internet, and customers can make seat reservations using the customer terminals 20. The customer terminals 20 are constituted by known computers such as smartphones and personal computers. The following describes each configuration in detail.

2. Various Types of Equipment

Next, various types of equipment provided in the restaurant will be described. FIG. 2 is a partial plan view of the restaurant, FIG. 3 is a cross-sectional view of the transport path in the restaurant, FIG. 4 is a side view of the transport path, and FIG. 5 shows side views of a container transported along the transport path.

2-1. Accepting Terminal

As shown in FIG. 2, the accepting terminal 5 is disposed near the entrance of the restaurant. The accepting terminal 5 includes a touch panel display. The accepting terminal 5 accepts customers who come without making reservations and customers who come after making reservations. Details of acceptance of customers by the accepting terminal 5 will be described later.

2-2. Table and Transport Path

As shown in FIG. 2, the restaurant includes the transport path 2 for transporting containers 1 each containing a food or beverage item between a customer section S1 and a kitchen section S2. The customer section S1 includes a plurality of seat booths 3 separated from each other by partitions, and each of the seat booths 3 is arranged along the transport path 2. A rectangular table 31 is set in each of the seat booths 3 such that one side of the table 31 is in contact with the transport path 2.

As shown in FIG. 3, a plate 11 on which a food or beverage item (sushi, soup, sweets, a beverage, etc.) is placed is contained in each of the containers 1 transported along the transport path 2, and a customer seated in each of the seat booths 3 takes out a plate 11 on which a food or beverage item is placed from a container 1 on the transport path 2, and consumes the food or the beverage at the table 31.

A touch panel display 32 to be used for ordering, settling a bill, and the like and a slotting device 33 for slotting plates 11 are disposed on each table 31 in each seat booth 3. The following describes each configuration in detail.

A flat chain conveyor 21 is disposed on the transport path 2 and is configured to circulate between the customer section S1 and the kitchen section S2, using a motor (not shown). The containers 1 described above are placed at predetermined intervals on the flat chain conveyor 21 and travel along the transport path 2.

As shown in FIG. 4, a first camera 41 and a second camera 42 are respectively disposed upstream and downstream of the table 31 in each seat booth 3, above the transport path 2. These cameras 41 and 42 are used for bill settling processing performed by the bill settling device 8, which will be described later. The first camera 41 and the second camera 42 are installed in each seat booth 3.

The first camera 41 sequentially captures images of the containers 1 traveling along the transport path 2, thus acquiring captured images of the containers 1. Similarly, the second camera 42 also sequentially captures images of the containers 1 traveling along the transport path 2, thus acquiring captured images of the containers 1.

As shown in FIG. 5(a), each container 1 includes a placement part 12 to be placed on the flat chain conveyor 21, and a dome-shaped transparent cover 13 configured to be openable and closable and cover the placement part 12. A plate 11 on which a food or beverage item is placed can be placed on the placement part 12. The cover 13 is swingably fixed to the placement part 12 via an opening/closing mechanism 14 including a hinge, and can be in a closed state (first state) in which the cover 13 covers the plate 11 placed on the placement part 12 as shown in FIG. 5(a), and an open state (second state) in which the plate 11 on which a food or beverage item is placed can be taken out from the placement part 12 as shown in FIG. 5(b).

In the closed state, a lower edge of the cover 13 is in contact with a peripheral edge of the plate 11 placed on the placement part 12. Accordingly, the food or beverage item placed on the plate is covered by the cover, and a hygienic state is maintained so as to prevent dirt or the like from attaching to the food or beverage item. In addition, an arc-shaped cut-out 131 is formed in a lower end portion of the cover 13 so as to face the seat booth 3 side, thus allowing a customer to hold an edge portion of the contained plate 11 through the cut-out 131 when the cover 13 is in the closed state. When the customer pulls the plate 11 slightly upward after inserting his or her fingers from the cut-out 131 and holding the edge portion of the plate 11, the cover 13 flips up and opens via the opening/closing mechanism 14. This allows the customer to take out the plate 11 from the container 1 while holding the plate 11 with his or her fingers.

A display tag 132 indicating the type of the food or beverage item contained in the cover 13 and an identifier 133 in which identification information for identifying the container 1 is embedded are provided on an upper portion of the cover 13. For example, the type of sushi, such as tuna or sea bream, may be displayed on the display tag 132. The identifier 133 may be, but is not particularly limited to, an identifier that is readable with a camera, such as a bar code, a QR code (registered trademark), or a distinctive symbol, for example.

Next, the touch panel display 32 installed on the table 31 will be described. The touch panel display 32 displays a screen for accepting an order from the customer. For example, a menu is displayed and the customer can make an order by touching a food or beverage item shown in the menu. The bill settling device 8 counts and stores types and the number of ordered food and/or beverage items as described later. The order made as described above is transmitted to the kitchen section S2 and the ordered food or beverage item is prepared in the kitchen section S2. Thereafter, the ordered food or beverage item is placed on the plate 11 and transported in the container 1. At this time, the container 1 is provided with an indication explicitly indicating that the food or beverage item was ordered, and a table number or the like to indicate the customer who made the order. Alternatively, it is also possible to provide a dedicated transport path for transporting only ordered food and/or beverage items.

Next, the slotting device 33 will be described. As shown in FIG. 3, the slotting device 33 includes a guide path 332 having a slot 331 that is open on the table 31 and into which plates are slotted, and a sensor 333 that is provided inside the guide path 332 and detects plates 11 passing through the guide path 332. The guide path 332 extends obliquely downward toward the transport path 2 and is connected to a plate collecting channel 22 provided inside the transport path 2. The plate collecting channel 22 extends to the kitchen section S2 and is connected to a vessel (not shown) provided in the kitchen section S2. Also, water flows through the plate collecting channel 22 toward the vessel. When a plate 11 slotted from the slot 331 drops down into the plate collecting channel 22 via the guide path 332, the plate 11 is carried to the vessel by water. The plate 11 is then collected in the vessel and reused after being washed.

When plates 11 that have passed through the guide path 332 are detected by the sensor 333, the number of plates is stored by the bill settling device 8 as described later.

A display prompting the customer to slot a plate 11, from which a food or beverage item has been consumed, into the slot 331 can be displayed on the touch panel display 32 or in the seat booth 3.

3. Management System

Next, the management system 6 will be described. As shown in FIG. 1 described above, the management system 6 includes the accepting device 7 and the bill settling device 8. First, the accepting device 7 will be described.

3-1. Accepting Device

FIG. 6 is a block diagram of the accepting device. As shown in FIG. 6, the accepting device 7 is a computer including a control unit 71, a storage unit 72, a communication interface 73, and the like, which are electrically connected to each other. The accepting terminal 5 described above and a speaker 55 are electrically connected to the accepting device 7.

The control unit 71 includes a CPU (Central Processing Unit), a RAM (Random. Access Memory), a ROM (Read Only Memory), and the like, and performs various types of processing for accepting customers. Details will be described later. The storage unit 72 is an auxiliary storage device such as a hard disk drive or a solid state drive, and stores a program 721 to be executed by the control unit 71 and information such as reservation information 722, acceptance information 723, and seat information 724.

The communication interface 73 is an interface for performing wired or wireless communication, such as a wired LAN (Local Area Network) module or a wireless LAN module. That is, the communication interface 73 is an example of a communication unit configured to communicate with other devices. The accepting device 7 in the present embodiment can be connected to the customer terminals 20 via the communication interface 73 and the Internet. Communication can also be performed via a local network within the restaurant other than the Internet.

Next, the following describes a functional configuration (software configuration) of the accepting device 7 together with a procedure from acceptance to guidance to a seat. The control unit 71 of the accepting device 7 loads the program 721 stored in the storage unit 72 into the RAM. Then, the CPU of the control unit 71 controls each component by interpreting and executing the program 721 loaded into the RAM. Thus, the accepting device 71 of the present embodiment functions as a computer including a reservation accepting unit 661, an entrance accepting unit 662, a vacant seat processing unit 663, a seat setting unit 664, and a start setting unit 665 as shown in FIG. 6. The following describes these functional units.

The reservation accepting unit 661 performs the following processing to accept a reservation from a customer terminal 20. For example, a reservation screen is displayed on a display 201 of the customer terminal 20 as shown in FIG. 7, and the customer inputs a restaurant name, the number of people, a reserved date, and a reserved time via the reservation screen. When the reservation is complete, reservation content is displayed on the display 201 as shown in FIG. 8. The displayed reservation content includes a reservation number (reservation identification information), and the customer is accepted in the restaurant by inputting the reservation number to the accepting terminal 5 in the restaurant as described later. A scheduled guidance time is also displayed. Note that information to be used to identify a reservation is not particularly limited, and may be various types of information such as a QR code (registered trademark) or a bar code, for example, other than the reservation number described above.

There is no particular limitation on the method for generating the reservation screen described above. For example, a control language such as the HTML (Hyper Text Markup Language) may be transmitted from the management system 6 or another reservation server (not shown) to the customer terminal 20, and interpreted and executed by browser software or another dedicated application program in the customer terminal 20 to present the reservation screen to the customer.

The reservation accepting unit 711 stores the restaurant name, the number of people, the reserved date, the reserved time, and the reservation number in association with each other as reservation information 722 in the storage unit 72 of the accepting device 7.

The entrance accepting unit 712 performs the following processing to accept entrance of the customer via the accepting terminal 5. As shown in FIG. 9, an accepting screen is displayed on a touch panel display 51 of the accepting terminal 5. The accepting screen is configured to accept both a customer who came without making a reservation and a customer who came after making a reservation. A customer who came without making a reservation is prompted to input the number of people. When the customer touches a corresponding number of people in the screen, acceptance is complete and an acceptance number is displayed as shown in FIG. 10, for example. The acceptance number is stored as acceptance information 723 in association with the number of people, in the storage unit 72 of the accepting device 7. The accepting terminal 5 can print the acceptance number on a sheet of paper and provide it to the customer.

On the other hand, a customer who has made a reservation inputs the reservation number via the accepting screen shown in FIG. 9. As a result, a screen shown in FIG. 11 is displayed on the touch panel display 51, and the customer waits until he or she is guided. When the reservation number is input, the entrance accepting unit 652 adds a flag indicating entrance of the customer to the reservation information 662 and stores the reservation information together with the flag in the storage unit 72.

When any of the tables 31 in the restaurant becomes vacant, the vacant seat processing unit 713 performs the following processing. First, seat information 724 is allocated to each table 31. The seat information 724 includes a table number, a seating capacity, the type of the table, a flag indicating vacancy, or the like, and is stored in the storage unit 72. When a customer has finished eating and/or drinking and left the table 31, a staff member of the restaurant cleans the table 31. At this time, a door (not shown) for widely opening the slot 331 can be opened to clean the inside of the slot 331. When the door is opened, the vacant seat processing unit 713 determines that the table is being cleaned, and when the door is closed after cleaning is finished, the vacant seat processing unit 713 adds a flag indicating that the table 31 is vacant to the seat information and stores the seat information together with the flag in the storage unit 72. As described above, information that can be referred to in order to find if any table 31 is vacant or not is stored in the storage unit 72. Preferably, a cleaning complete button is provided at a position where the button cannot be seen from customers to prevent customers from pressing the button by mistake. For example, the cleaning complete button can be provided inside the slot 331 of the slotting device 33. There is no particular limitation on the method for setting completion of cleaning, i.e., vacancy of the table 31. For example, vacancy of the table 31 may be input via the touch panel display 32 installed on the table 31, rather than being set upon the door being opened and closed as described above. Alternatively, a switch for setting vacancy of the table 31 may be provided separately.

The seat setting unit 714 performs the following processing to guide a customer to a vacant seat. That is, the seat setting unit 714 refers to the seat information 724, and if there is a vacant seat, the seat setting unit 714 associates the acceptance information 723 with the seat information 724 relating to the vacant table 31 in a predetermined order. For example, when the seating capacity of the vacant table 31 matches the number of people included in the acceptance information 723, the customer corresponding to the acceptance information 723 is guided to that table 31 in the accepted order. Although there is no particular limitation on the method for guiding the customer to the table 31, it is possible to give a notice indicating the acceptance number of the customer who can be guided and the number of the table 31 to which the customer can be guided, with use of the speaker 55, for example. Alternatively, it is possible to install a display (not shown) for displaying the acceptance number of the customer who can be guided and the number of the table to which the customer can be guided, or provide the customer with a terminal for informing that he or she can be guided, or guide the customer by a staff member of the restaurant.

However, there is no particular limitation on the order in which customers are guided. If the seating capacity of the vacant table 31 matches the number of people included in the acceptance information 723 of a customer, the customer may be guided earlier than another customer even if the acceptance information 723 of the customer was set later than the acceptance information 723 of the other customer. Also, a customer whose reservation information 722 has been stored is guided during the scheduled guidance time displayed as the reservation content, irrespective of the accepted order described above. That is, vacant seats corresponding to the number of people are secured as far as possible before the end of the scheduled guidance time, and if a flag indicating entrance of the customer has been added to the reservation information 722, the reservation information 722 is stored in association with the seat information 724 in the storage unit 72, and the customer is guided to the table 31 as described above.

The start setting unit 715 performs processing for setting the start of eating or drinking. That is, when the acceptance information 723 or the reservation information 722 is associated with the seat information 724, the start setting unit 715 records that point in time (or a point in time when a predetermined period has elapsed from that point in time) as an eating and/or drinking start time (eating and/or drinking start information) in the storage unit 72 in association with the seat information 724. Thus, it is possible to automatically store the time point at which eating or drinking is started at that table 31. Moreover, the eating and/or drinking start time is also stored as consumption information 822, which will be described later, in association with the seat information 724.

3-2. Accepting Processing

Next, the following describes accepting processing performed by the accepting device 7 configured as described above. First, processing performed when a reservation has not been made will be described with reference to FIG. 12. As shown in FIG. 12, first, when a customer has entered the restaurant and input information required for acceptance to the accepting terminal 5, the entrance accepting unit 712 generates the acceptance information 723 and issues an acceptance number (step S101). Then, when a vacant seat is set by the vacant seat processing unit 713 and is secured (YES in step S102), the seat setting unit 714 checks whether the acceptance information 723 matches the vacant seat. Whether the acceptance information matches the vacant seat is checked in terms of the accepted order, the number of people, and the like, for example. When the acceptance information 723 matches the vacant seat (YES in step S103), the acceptance information 723 is associated with the seat information 724 relating to the vacant seat, and the start of eating and/or drinking is set (step S104). Subsequently, the customer is guided to the vacant table 31 (step S105).

Next, processing performed when a reservation has been made will be described with reference to FIG. 13. As shown in FIG. 13, first, when a customer makes a reservation via the customer terminal 20, the reservation accepting unit 71 accepts the reservation and generates the reservation information 722 (step S201). Also, reservation identification information such as a reservation number is transmitted to the customer terminal 20. Next, when the customer has entered the restaurant and input the reservation number to the accepting terminal 5 (YES in step S202), the entrance accepting unit 712 adds a flag indicating entrance of the customer to the reservation information 722. Then, the seat setting unit 714 checks whether or not a vacant seat that matches the reservation information 722 has been prepared, and if the vacant seat has been prepared (YES in step S203), the reservation information 722 is associated with the seat information 724 relating to the vacant seat and the start of eating and/or drinking is set (step S204). Subsequently, the customer is guided to the vacant table 31 (step S205).

3-3. Bill Settling Device and Bill Settling Processing

Next, the following describes the bill settling device 8 and bill settling processing with reference to the drawings. FIG. 14 is a block diagram of the bill settling device. As shown in FIG. 14, the bill settling device 8 is a computer including a control unit 81, a storage unit 82, and the like, which are electrically connected to each other. Also, the first camera 41 and the second camera 42 described above are electrically connected to the bill settling device 8.

The control unit 81 includes a CPU (Central Processing Unit), a RAM (Random. Access Memory), a ROM (Read Only Memory), and the like, and performs various types of processing for bill settlement. Details will be described later. The storage unit 82 is an auxiliary storage device such as a hard disk drive or a solid state drive, and stores a program 821 to be executed by the control unit 81 and information such as consumption information 822, bill information 823, and container information 824.

Next, the following describes a functional configuration (software configuration) of the bill settling device 8. The control unit 81 of the bill settling device 8 loads the program 821 stored in the storage unit 82 into the RAM. Then, the CPU of the control unit 81 controls each component by interpreting and executing the program 821 loaded into the RAM. Thus, the bill settling device 8 according to the present embodiment functions as a computer including a slot processing unit 811, an order processing unit 812, a counting unit 813, a bill settlement starting unit 814, and a bill information generating unit 815 as shown in FIG. 14. The following describes these functional units.

The slot processing unit 811 performs processing for counting the number of plates that have been slotted into the slot 311 and detected by the sensor 333 at each table 31. This processing is performed during a period from when an eating and/or drinking start time is set as described above to when bill settling processing performed using the touch panel display 32 is completed as described later. The number of detected plates is stored as a portion of the consumption information 822 in the storage unit 82.

The order processing unit 812 counts types and the number of food and/or beverage items that have been ordered via the touch panel display 32, and stores the types and the number as a portion of the consumption information 822. This processing is also performed during a period from when the eating and/or drinking start time is set to when a bill settling start button is pressed.

The counting unit 813 performs processing for counting the number of plates that have been taken out from the transport path 2 to the table 31. The counting unit 813 counts the number of plates 11 that have been taken out from the transport path 2 shown in FIGS. 1 to 3 to the table 31, not from a dedicated transport path for transporting ordered food and/or beverage items.

The following describes the processing performed by the counting unit 813 with reference to FIG. 15 as well. FIG. 15 shows an example of a chronological list of container information.

The counting unit 813 determines whether the cover 13 of the container 1 is in the open state or the closed state using a known image recognition technique, based on captured images acquired by the cameras 41 and 42. The result of this determination is referred to as "open/close information". Also, the counting unit 813 acquires identification information of each container 1 from the identifier 133 captured in the captured images. The thus acquired open/close information, identification information, time at which image capture was performed, and information relating to the cameras with which image capture was performed are associated with each other, and are sequentially stored as the container information 824 in the storage unit 82. That is, a chronological list of the container information 824 such as that shown in FIG. 14 is stored in the storage unit 82. In order to improve the accuracy of the open/close information of the container 1, image capture may be performed a plurality of times (e.g., an odd number of times, such as five times) when the container 1 passes below each of the cameras 41 and 42, thus acquiring a plurality of captured images. Then, whether the container 1 is in the open state or the closed state is determined for each of the captured images using an image recognition technique, and one of the open state and the closed state in which the container 1 has been determined to be for a larger number of times may be used as the open/close information. The timing at which the open/closed state determination is performed is not particularly limited. The captured images may be stored in the storage unit 82, and thereafter the determination may be performed at a predetermined timing before bill settlement.

Then, when a bill button is touched as described later, the counting unit 813 reads out necessary container information 824 from the storage unit 82. That is, the counting unit 813 reads out container information 824 acquired with use of the cameras 41 and 42 in the corresponding seat booth 3 between the eating and/or drinking start time and an eating and/or drinking end time, which will be described later. The seat booth 3 for which bill settlement is performed can be identified because the cameras 41 and 42 with which image capture was performed are associated with the touch panel display 32 of the corresponding seat booth 3.

The counting unit 813 counts the number of containers 1 that are determined to be in the closed state using the first camera 41 and determined to be in the open state using the second camera 42, out of containers 1 that have passed by the seat booth 3. That is, if the same container 1 was in the closed state on the upstream side of the seat booth 3 and was in the open state on the downstream side thereof, this means that the cover 13 was opened and the plate 11 was taken out while the container 1 passed by the seat booth 3. For example, in the example shown in FIG. 15, the No. 8 container 1 is in the closed state in its image captured by the first camera 41 (camera No. 1), and is in the open state in its image captured by the second camera 42 (camera No. 2). Accordingly, it is determined that the plate 11 was taken out from the No. 8 container 1. Also, in this example, it is determined that the plate 11 was taken out from the No. 10 container 1 as well. Accordingly, the number of containers 1 for which such states have been detected is determined as the number of plates 11 that have been taken out, or in other words, the amount of consumption of food and/or beverage items.

Upon completing the count of the number of taken out plates 11 as described above, the counting unit 813 stores the number as a portion of the consumption information 822.

Next, the bill settlement starting unit 814 and the bill information generating unit will be described together with bill settling processing with reference to FIG. 15 as well. FIG. 16 is a flowchart of the bill settling processing.

First, the bill settlement starting unit 814 performs processing for starting bill settlement after eating and drinking are finished. That is, when the customer has touched a bill button (not shown) displayed on the touch panel display 32 after finishing eating and drinking (step S301), the touch panel display 32 displays a screen that prompts the customer to slot plates 11, from which food and/or beverage items have been consumed, into the slot 331 and to touch a slotting complete button (not shown) after slotting the plates. When the slotting complete button is touched, the bill settlement starting unit 814 stores that point in time as an eating and/or drinking end time in the consumption information 822 (step S302). As described above, the eating and/or drinking start time is also stored in the consumption information 822, and accordingly, an amount of food and/or beverage items consumed during a period (hereinafter may be referred to as an "eating and drinking period") between the eating and/or drinking start time and the eating and/or drinking end time is used for billing. That is, billing is performed based on the number of plates detected by the slot processing unit 811, the types and the number of food and/or beverage items ordered via the order processing unit 812, and the number of plates taken out from the transport path 2 and counted by the counting unit 813 during the eating and drinking period.

The bill information generating unit 815 performs the following processing for calculating the amount of payment. Billing may be performed based on any of the slot processing unit 811, the order processing unit 812, and the counting unit 813. For example, the amount of payment can be calculated based on the number of plates 11 detected by the slot processing unit 811.

When the count of the number of plates 11 that have been taken out is completed in this manner, the bill information generating unit 815 displays the counted number on the touch panel display 32 (step S303). In addition, a confirmation button (not shown) is displayed on the touch panel display 32, and a description prompting the customer to touch the confirmation button if the customer accepts the number of consumed plates (YES in step S304) is displayed. Then, if the customer touches the confirmation button (step S305), bill settling processing is performed. That is, the amount of payment according to the counted number of plates is calculated and transmitted to a point of sale (POS) register (not shown) (step S306). Upon completion of the transmission, a screen indicating completion of bill settlement is displayed on the touch panel display 32. Thereafter, the customer goes to the POS resister and makes the payment there.

If the customer cannot accept the counted number of plates 11 (NO in step S304), the customer may call a staff member for confirmation or the like. For this purpose, a button for calling a staff member is displayed on the touch panel display 32.

The number of plates 11 (the amount of consumption) is checked by the bill settling device 8 as well in addition to being checked based on a notification from the customer regarding the number of plates 11. For example, in a case where ordered food and/or beverage items and food and/or beverage items that have not been ordered are transported using the same transport path 2, the number of plates 11 counted by the counting unit 813 is equal to the number of plates 11 from which food and/or beverage items have been consumed, and accordingly, the number of plates 11 counted by the counting unit 813 usually matches the number of plates 11 detected by the slot processing unit 811. Therefore, when these numbers do not match, for example, recalculation may be performed by a staff member.

In a case where ordered food and/or beverage items and food and/or beverage items that have not been ordered are transported using different transport paths 2, a total of the number of food and/or beverage items ordered via the order processing unit 812 and the number of plates 11 counted by the counting unit 813 is equal to the number of plates 11 from which food and/or beverage items have been consumed, and accordingly, the total number usually matches the number of plates 11 detected by the slot processing unit 811. Therefore, when these numbers do not match, for example, recalculation may be performed by a staff member.

4. Features

The food and/or beverage item provision system configured as described above can provide the following effects.

(1) In the above embodiment, the start of eating and/or drinking is set when a vacant seat is secured and reservation information or acceptance information is associated with seat information relating to the vacant seat. Accordingly, an eating and/or drinking start time that serves as the basis of billing is taken as the start of ordering, the start of plate counting, or the like, and if the eating and/or drinking start time is input incorrectly or after some time has elapsed from the start of eating or drinking, there is a risk that billing cannot be performed accurately. However, the food and/or beverage item provision system according to the present embodiment automatically sets the start of eating and/or drinking upon entering a state where a customer can be guided to a vacant seat, and therefore, billing can be performed accurately. Moreover, human errors and the labor of staff members can be reduced.

(2) In the above embodiment, the number of plates (the amount of consumption of food and/or beverage items) is automatically calculated, and it is thus possible to reduce the time required for billing, human errors, and the labor of staff members. In particular, the number of plates is calculated using a plurality of means, and it is thus possible to accurately calculate the number of plates.

5. Modifications

Although an embodiment of the present invention has been described above, the present invention is not limited thereto, and various modifications may be made to the invention without departing from the spirit or essential characteristics thereof. The following modifications may be combined as appropriate.

(1) In the above embodiment, the management system is constituted by two computers serving as the accepting device and the bill settling device, but there is no particular limitation on the number of computers that realize these devices. For example, as long as it is possible to realize the functional units 711 to 715 of the control unit 71 shown in FIG. 16 and the functional units 811 to 815 of the control unit 81 shown in FIG. 14, there is no particular limitation on the number of computers that realize these units. Also, the various types of processing described above are realized by computers including general-purpose CPUs, but a part of the processing or the entire processing may be realized by one or more dedicated processors. Furthermore, a reservation may be accepted by a server of a facility other than the restaurant, and the reservation information 722 may be transmitted to the accepting device 7 of the restaurant, for example.

In the above embodiment, when a reservation number is input to the accepting terminal 5 by a customer who made a reservation, a flag indicating entrance of the customer is added to the reservation information 722, but there is no limitation on the method for recording entrance of the customer relating to the reservation information 722 as long as entrance of the customer can be recorded.

(2) The reservation screen of the customer terminal 20 and the accepting screen of the accepting terminal 5 shown in the above embodiment are examples, and various changes can be made. For example, items to be input may be other than those described above.

(3) A case is described where the customer takes the plate 11 out from the container 1 transported along the transport path 2 and consumes a food or beverage item, but a configuration is also possible in which the customer can order a desired food or beverage item via the touch panel display 32. The order is then transmitted to the kitchen section S2, and the ordered food or beverage item is prepared. In this case, a container 1 containing the ordered food or beverage item is transported using the transport path 2, and an indication such as the number of the seat booth 3 may be attached to the container 1 to indicate that the ordered food or beverage item is contained in the container 1. Alternatively, a screen for providing an advance notice indicating that the container 1 containing the ordered food or beverage item will soon be transported may be displayed on the touch panel display 32. In this case as well, the plate 11 is taken out from the container 1, and thus the plate 11 can be counted in the same manner as that describe above.

(4) The configuration of the container 1 is not particularly limited, as long as the container 1 can carry the plate 11 and it is possible to determine the state in which the plate 11 is placed therein and the state in which the plate 11 has been taken out therefrom, based on captured images. Accordingly, the cover 13 is not necessarily needed, and the identifier 133 need only be disposed at any position on the container 1.

(5) In the above embodiment, the open/close information of the container 1 and the identification information of the container 1 are acquired with use of the cameras 41 and 42 when the number of plates is counted by the counting unit 813, but the present invention is not limited thereto. That is, these pieces of information can also be acquired with use of various means (a first information acquisition unit, a second information acquisition unit) including various sensors other than the cameras 41 and 42, and communication means such as IC tags, for example. The open/close information and the identification information may be acquired by different information acquisition units.

(6) It is possible to place a robot on the transport path 2 and cause the robot to talk to customers or perform some operations. For example, when the robot passes by the table of a customer who has taken a plate of tuna, the robot is caused to speak to surprise the customer by saying, for example, "Was today's tuna good?", thus providing increased amusement.

(7) Information regarding the type of the food or beverage item contained in the container 1 may be embedded in the identifier. This makes it possible to recognize types and the number of food and/or beverage items located on the transport path 2 from images of identifiers captured by the cameras 41 and 42. Accordingly, food and/or beverage items to be supplied to the transport path 2 can be easily adjusted. It is also possible to keep track of types and the number of food and/or beverage items taken out from the transport path 2 at each table 31.

It is also possible to use such information relating to the food and/or beverage items acquired by each customer and a customer management system in conjunction with each other. For example, a registered account of each customer and information acquired by the counting unit 813 can be associated with each other, thus providing a benefit to the account of the customer according to types and the number of food and/or beverage items acquired at the table 31.

(8) The food and/or beverage item provision system described above may be configured to include only the accepting device, and bill settlement may be performed through another processing. In this case as well, if the start of eating and/or drinking can be automatically recorded by the accepting device, bill settling processing can be accurately performed, and the eating and/or drinking start time can be used as data for customer analysis, for example.

(9) As described above, billing is performed in the bill settling processing based on the number of plates detected by the slot processing unit 811, the number of food and/or beverage items ordered via the order processing unit 812, and the number of plates taken out from the transport path 2 and counted by the counting unit 813. At this time, the customer is prompted to slot all plates 11 on the table 31 into the slot 331. If all the plates 11 are slotted into the slot 331, the number of plates detected by the slot processing unit 811 should match a total of the number of food and/or beverage items ordered via the order processing unit 812 and the number of plates taken out from the transport path 2 and counted by the counting unit 813. At this time, the calculation result may be displayed on the touch panel display 32 to make it easy for a restaurant staff member to see the result. For example, if the numbers calculated as described above do not match, an indication may be displayed in yellow on the touch panel display 32, and if the numbers match, an indication may be displayed in white. This makes it easy for the restaurant staff member to visually recognize a mismatch between the calculated numbers at the table for which bill settling processing is being performed, for example, and accordingly, the restaurant staff member can immediately perform recalculation. Note that whether the calculated numbers match or do not match may be indicated in various ways other than the use of different colors.

Other than the above, states of the bill settling processing may be displayed on the touch panel display 32 as appropriate. For example, the above-described indication in yellow is generally displayed before the customer touches the confirmation button during the bill settling processing (step S305), but it is also possible to display an indication in yellow when a restaurant staff member is called by the customer before the confirmation button is touched. Also, an indication in red may be displayed on the touch panel display 32 when a restaurant staff member is called by the customer after the bill settling processing is completed. On the other hand, an indication may be displayed in white when the bill settling processing has been completed normally. Displaying states of the bill settling processing on the touch panel display 32 as described above makes it easy for the restaurant staff member to see the state of bill settlement.

(10) Plates 11 on which food and/or beverage items are placed may be transported using a portion of the transport path 2, rather than the entire transport path 2, depending on the number of customers. For example, when the number of customers is small, a portion of the transport path 2 may be used to transport plates 11 so as to pass through at least occupied tables 11 and seats, rather than all tables 31 and seats.

(11) In the above embodiment, the food and/or beverage item provision system according to the present invention is applied to a sushi provision system, but the food and/or beverage item provision system may provide other food and/or beverage items. The configuration of the transport path and the configuration of the seat booth described above are merely examples, and can be modified as appropriate.

REFERENCE SIGNS LIST

1 Container (carrier)
2 Transport path
31 Table
32 Touch panel display (display unit)
331 Slot (slot portion)
41 First camera
42 Second camera
7 Accepting device
711 Reservation accepting unit
712 Entrance accepting unit
713 Vacant seat processing unit
714 Seat setting unit
715 Start setting unit
814 Bill settlement starting unit
815 Bill information generating unit

The invention claimed is:

1. A food and/or beverage item provision system for providing food and/or beverage items to a customer in a restaurant including a plurality of seats for customers, the system comprising:
   an entrance accepting unit configured to accept a seat-waiting request from a customer and store the request as acceptance information;
   a vacant seat processing unit configured to set any seat among the plurality of seats that has become vacant, as a vacant seat in association with seat information relating to the seat;
   a seat setting unit configured to associate the acceptance information with seat information relating to a vacant seat in a predetermined order under a predetermined condition when any seat among the seats for customers has been set as the vacant seat by the vacant seat processing unit;
   a start setting unit configured to automatically record a time point at which the acceptance information is determined as being associated with the seat information as an eating and/or drinking start time;
   a transport path that passes along a seat for a customer and is configured to transport carriers on which plates are placeable with food and/or beverage items placed thereon;
   a first information acquisition unit disposed upstream of the seat and configured to acquire information relating to the carriers on the transport path;
   a second information acquisition unit disposed downstream of the seat and configured to acquire information relating to the carriers on the transport path;
   a counting unit configured to count a number of plates taken out from the transport path to the seat based on the information acquired from the first and second information acquisition units from the eating and/or drinking start time to an eating and/or drinking end time; and
   a billing information generating unit configured to generate a bill information based on the number of plates counted by the counting unit.

2. The food and/or beverage item provision system according to claim 1, further comprising:
   a bill settlement starting unit provided for each seat and configured to start bill settlement for the seat, wherein the bill information generating unit is configured to calculate an amount of food and/or beverage items consumed at the seat during a period from the start of eating and/or drinking to the start of bill settlement and generate bill information based on the amount of food and/or beverage items.

3. The food and/or beverage item provision system according to claim 2, further comprising:
   an order processing unit provided for each seat and configured to accept an order of a food or beverage item,
   wherein the bill information generating unit is configured to generate the bill information based on an order accepted by the order processing unit.

4. The food and/or beverage item provision system according to claim 2, further comprising:
   a slot portion that is provided at each seat and into which the plate that has been taken out from the transport path and from which the food or beverage item has been consumed is slotted; and
   a slot processing unit configured to count the number of plates slotted into the slot portion, wherein the bill information generating unit is configured to generate the bill information based on the number of plates counted by the slot processing unit.

5. The food and/or beverage item provision system according to claim 2,
wherein each of the carriers is provided with identification information for identifying the carrier,
each of the carriers is capable of being in a first state in which a plate is placed on the carrier and a second state in which no plate is placed on the carrier,
the counting unit is configured to execute:
a first determination step of determining which state the carrier is in with use of the first information acquisition unit;
a second determination step of determining which state the carrier is in with use of the second information acquisition unit;
a first storage step of storing identification information of the carrier and the state of the carrier acquired by the first information acquisition unit in association with each other;
a second storage step of storing identification information of the carrier and the state of the carrier acquired by the second information acquisition unit in association with each other; and
a counting step of counting a food or beverage item carried by the carrier as a food or beverage item consumed at the table if the carrier is determined to be in the first state with use of the first information acquisition unit and the same carrier is determined to be in the second state with use of the second information acquisition unit.

6. The food and/or beverage item provision system according to claim 1,
wherein the seat setting unit is configured to notify the customer of the seat information relating to the vacant seat after associating the seat information relating to the vacant seat.

7. A food and/or beverage item provision system for providing food and/or beverage items to a customer in a restaurant including a plurality of seats for customers, the system comprising:
a reservation accepting unit configured to store reservation information relating to a reservation from the customer and give reservation identification information associated with the reservation information to the customer;
a vacant seat processing unit configured to set any seat among the plurality of seats that has become vacant, as a vacant seat in association with seat information relating to the seat;
an entrance accepting unit configured to store entrance of the customer relating to the reservation information upon the reservation identification information being input at the restaurant;
a seat setting unit configured to associate the reservation information of the entered customer with seat information relating to a vacant seat in a predetermined order under a predetermined condition when any seat among the seats for customers has been set as the vacant seat by the vacant seat processing unit;
a start setting unit configured to automatically record a time point at which acceptance information is determined as being associated with the seat information as an eating and/or drinking start time;
a transport path that passes along a seat for a customer and is configured to transport carriers on which plates are placeable with food and/or beverage items placed thereon;
a first information acquisition unit disposed upstream of the seat and configured to acquire information relating to the carriers on the transport path;
a second information acquisition unit disposed downstream of the seat and configured to acquire information relating to the carriers on the transport path;
a counting unit configured to count a number of plates taken out from the transport path to the seat based on the information acquired from the first and second information acquisition units from the eating and/or drinking start time to an eating and/or drinking end time; and
a billing information generating unit configured to generate a bill information based on the number of plates counted by the counting unit.

8. The food and/or beverage item provision system according to claim 7, further comprising:
a bill settlement starting unit provided for each seat and configured to start bill settlement for the seat,
wherein the bill information generating unit is configured to calculate an amount of food and/or beverage items consumed at the seat during a period from the start of eating and/or drinking to the start of bill settlement and generate bill information based on the amount of food and/or beverage items.

9. The food and/or beverage item provision system according to claim 8, further comprising:
an order processing unit provided for each seat and configured to accept an order of a food or beverage item,
wherein the bill information generating unit is configured to generate the bill information based on an order accepted by the order processing unit.

10. The food and/or beverage item provision system according to claim 8, further comprising:
a slot portion that is provided at each seat and into which the plate that has been taken out from the transport path and from which the food or beverage item has been consumed is slotted; and
a slot processing unit configured to count the number of plates slotted into the slot portion,
wherein the bill information generating unit is configured to generate the bill information based on the number of plates counted by the slot processing unit.

11. The food and/or beverage item provision system according to claim 8,
wherein each of the carriers is provided with identification information for identifying the carrier,
each of the carriers is capable of being in a first state in which a plate is placed on the carrier and a second state in which no plate is placed on the carrier,
the counting unit is configured to execute:
a first determination step of determining which state the carrier is in with use of the first information acquisition unit;
a second determination step of determining which state the carrier is in with use of the second information acquisition unit;
a first storage step of storing identification information of the carrier and the state of the carrier acquired by the first information acquisition unit in association with each other;

a second storage step of storing identification information of the carrier and the state of the carrier acquired by the second information acquisition unit in association with each other; and a counting step of counting a food or beverage item carried by the carrier as a food or beverage item consumed at the table if the carrier is determined to be in the first state with use of the first information acquisition unit and the same carrier is determined to be in the second state with use of the second information acquisition unit.

12. The food and/or beverage item provision system according to claim 7, wherein the seat setting unit is configured to notify the customer of the seat information relating to the vacant seat after associating the seat information relating to the vacant seat.

13. A food and/or beverage item provision system for providing food and/or beverage items to a customer in a restaurant including a plurality of seats for customers, the system comprising:

a transport path that passes along a seat for a customer and is configured to transport carriers on which plates are placeable with food and/or beverage items placed thereon;

a first sensor disposed upstream of the seat and configured to acquire information relating to the carriers on the transport path;

a second sensor disposed downstream of the seat and configured to acquire information relating to the carriers on the transport path;

at least one processor; and at least one memory storing computer program code, wherein the computer program code, when executed by the at least one processor, is configured to cause the at least one processor to:

accept a seat-waiting request from a customer and store the request as acceptance information;

set any seat among the plurality of seats that has become vacant, as a vacant seat in association with seat information relating to the seat;

associate the acceptance information with seat information relating to a vacant seat in a predetermined order under a predetermined condition when any seat among the seats for customers has been set as the vacant seat;

automatically record a time point at which the acceptance information is determined as being associated with the seat information as an eating and/or drinking start time;

count a number of plates taken out from the transport path to the seat based on the information acquired from the first and second sensors from the eating and/or drinking start time to an eating and/or drinking end time; and, generate a bill information based on the counted number of plates.

* * * * *